(12) United States Patent
Alluru

(10) Patent No.: US 12,141,119 B2
(45) Date of Patent: Nov. 12, 2024

(54) WRITE PROTECTING TENANT DATA IN A MULTI-TENANT DATABASE SYSTEM

(71) Applicant: Salesforce, Inc., San Francisco, CA (US)

(72) Inventor: Sai Rama Raju Alluru, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 1 day.

(21) Appl. No.: 18/090,429

(22) Filed: Dec. 28, 2022

(65) Prior Publication Data
US 2024/0220476 A1    Jul. 4, 2024

(51) Int. Cl.
*G06F 7/00* (2006.01)
*G06F 16/23* (2019.01)
*G06F 17/00* (2019.01)

(52) U.S. Cl.
CPC ...... *G06F 16/2343* (2019.01); *G06F 16/2358* (2019.01)

(58) Field of Classification Search
None
See application file for complete search history.

(56) References Cited

U.S. PATENT DOCUMENTS

| | | | |
|---|---|---|---|
| 2013/0007183 A1* | 1/2013 | Sorenson, III | G06F 3/0632 709/213 |
| 2022/0245094 A1* | 8/2022 | Jujjuri | G06F 12/0868 |
| 2023/0169093 A1* | 6/2023 | Whitaker | G06F 16/278 707/803 |

\* cited by examiner

*Primary Examiner* — Tuan A Pham

(57) ABSTRACT

A system performs write protection of data that being copied. The write protection protects the data from being corrupted by applications. The system allows writes that are part of the data transfer from the source database. The system uses triggers to implement write protection. The system stores a list of tenants that are write protected in a metadata table. The system implements a statement level trigger that caches the metadata table in memory. If the cache is determined to be older than the limit specified by the TTL, the system reloads the cache. The statement may perform multiple row level operations. A row level operation implements a row level trigger that checks the in-memory data structure to determine whether the tenant is write protected. If the tenant is determined to be write protected, the system rolls back the row level operation.

20 Claims, 7 Drawing Sheets

WRITE PROTECTING TENANT DATA IN A MULTI-TENANT DATABASE SYSTEM

BACKGROUND

Field of Art

This disclosure relates in general to multi-tenant databases and more specifically to write protecting data of a tenant stored in a multi-tenant database.

Description of the Related Art

Online systems typically store data in a database, for example, user information, information describing different types of objects, information describing activities such as online transactions performed by the online system. Enterprises often require copying of data stored on databases, for example, for migrating data of a tenant from one database to another database. A tenant may migrate from one database to another database for various reasons, for example, if the current database has reached its capacity, if the tenant is migrating to a cloud platform, or for compliance reasons. Copying data stored in a database for a tenant can be a long process that can take days to complete. If the data at the target database gets modified by any entity other than the process copying the data, the data in the target data can become inconsistent. For example, if an application modifies the data in the target database before the copy process is complete, the data may get corrupted, and the data copying may have to be redone. This results in waste of computing resources and significant down time.

Figure 1:
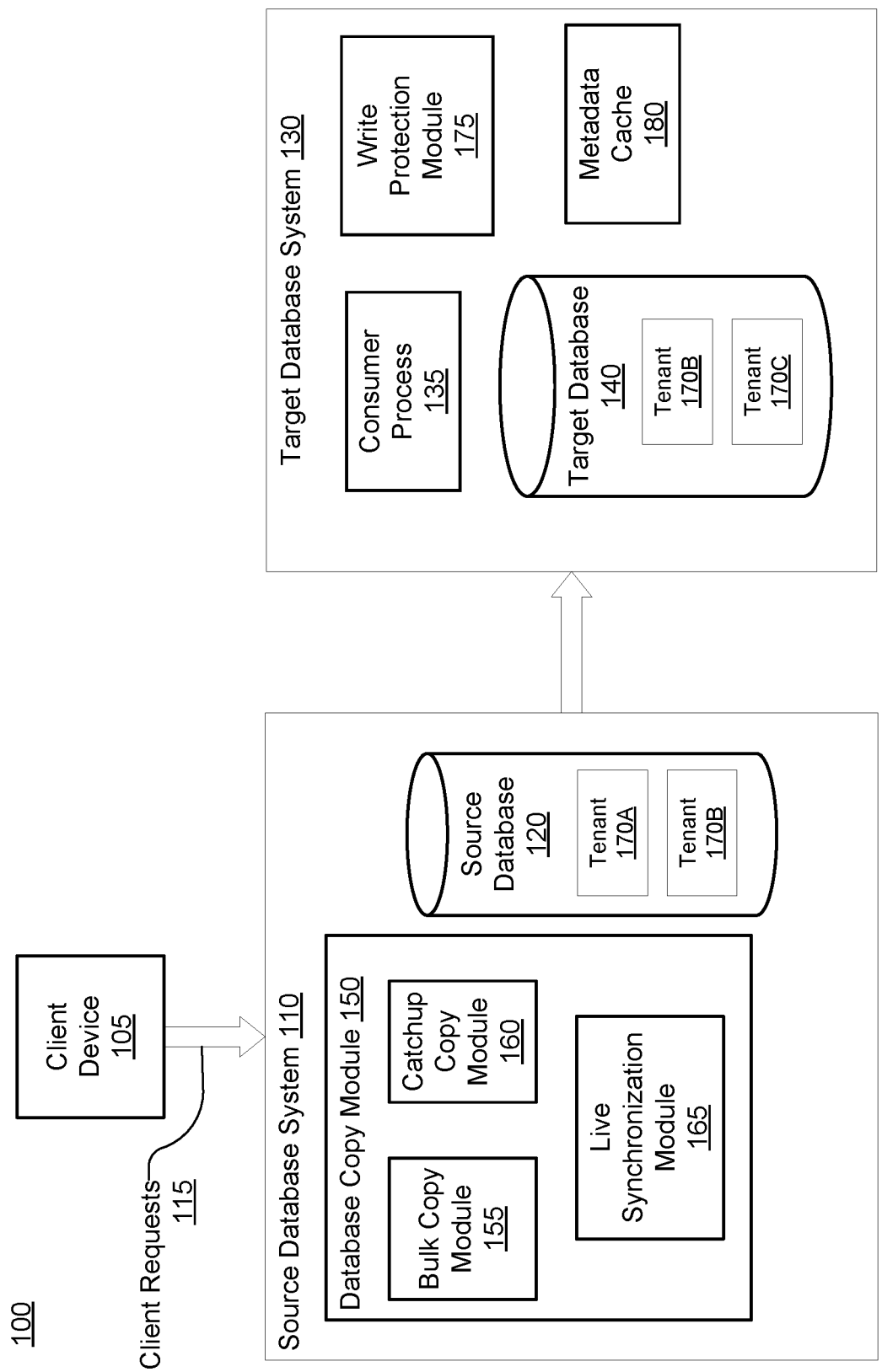
FIG. 1 is a block diagram of a system environment illustrating copying of data stored in a database from a source database system to a target database system, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

A system according an embodiment performs write protection of data that being copied. The write protection protects the data from being corrupted by applications. However, the system allows writes that are part of the data transfer from the source database. The system uses triggers to implement write protection. Accordingly, if an application writes to the database of a tenant that is write protected, a trigger causes the write operation to roll back. The write is allowed to proceed if the tenant is not write protected. However, an implementation that requires every write to check whether the tenant is write protected is very inefficient and would affect the performance of all applications running on the target database.

According to an embodiment, the system stores a list of tenants that are write protected in a metadata table. The system implements a DML (data manipulation language) statement level trigger that caches the metadata table in memory if necessary. The cache implements TTL (time to live). Accordingly, a DML statement causes the trigger to check whether the cache is old. If the cache is determined to be older than the limit specified by the TTL, the system reloads the cache. The DML statement may perform multiple row level operations. A row level operation implements a row level trigger that checks the in-memory data structure to determine whether the tenant is write protected. If the tenant is determined to be write protected, the system rolls back the row level operation.

Overall System Environment

Databases used by organizations have limits. If an organization exceeds the limits of the database used, the organization may use another instance of the database. In a multi-tenant environment, scaling via adding additional instances is used as new tenants are added to a new database. If a user of a tenant interacts with the system, the user is routed to the application instance that is connected to the new database where data for that tenant resides.

The system according to various embodiments implements a data synchronization service (DSS) that creates a point-in-time consistent copy of a data of a tenant (also referred to as an org or organization) from a source database to a target database. The system copies the data by performing a bulk copy and applying the change data stream of transactions obtained from the source database to the target database.

The system may perform copying of tenant data for other purposes, for example, data migration. The system may perform data migration for various reason. For example, a database used by the tenant may reach its capacity, and the tenant moves to another database to make capacity. A tenant may move to another substrate, for example, move data from first party datacenters to a cloud platform. A tenant may move data for compliance reasons, for example, GDPR (General Data Protection Regulation) or other compliances.

FIG. 1 is a block diagram of a system environment illustrating copying of data stored in a database from a source database system to a target database system, according to one embodiment. The system environment 100 comprises a source database system 110, a target database system 130, and one or more client devices 105. In other embodiments, the system environment 100 may include other more or fewer components, for example, there may be third party systems that interact with the online system 110. The term system used herein refers to the overall system environment and may include modules that execute in the source database system 110 or the target database system 130. The system creates a copy of a database of the source database system 110 in the target database system 130.

The system creates a copy of the database by a bulk copy of data and sending a change data stream of transactions executed in the source database system to the target database system. The bulk copy phase is also referred to herein as the cloning phase. A transaction represents changes performed to one or more database tables. A tenant copying process can take a long duration spanning days to weeks. The applications that are connected to the source database and target database are active and serve the other tenants that are hosted in those databases.

Although embodiments are described using terminology of relational databases, the techniques described may be applied to other types of database systems, for example, document-based database systems, NOSQL database systems, graph database systems, and so on.

The source database system 110 includes a source database 120 and a database copy module 150. The target database system 130 includes a target database 140 and a consumer process 135 that may be executed by a consumer module. A database, for example, the source database 120 or the target database 140 stores data and may allow users to perform database operations including queries that access data as well as database commands that modify the data. For example, the database may store records comprising fields and a query may insert new records, update existing records, and delete records. A query may request fields of records. For a multi-tenant system, the database may store data for multiple enterprises, each enterprise representing a tenant of the multi-tenant system.

A database processes queries to process data stored in database. In an embodiment, the database processes queries in a particular query language, for example, structured query language (SQL). A query may be used to perform an action using the database, for example, update a record, add new record, or delete a record. The query may be used to access information, for example, values stored in one or more records.

The source database system 110 and the target database system 130 may include other modules than those shown in FIG. 1. Functionality indicated as being performed by a particular module as described herein may be performed by other modules. Furthermore, although the database copy module 150 is shown as part of the source database system, in other embodiments, the database copy module 150 may be part of another system or various modules within the database copy module 150 may be part of different systems.

The system performs copying of the source database 120 of the source database system 110 to a target database 140 of the target database system 130. The target database system 130 includes a write protection module 175 that protects the database from write operations from various applications that may access the target database 140. The write protection module 175 performs write protection of data of tenants for which data is currently being migrated from the source database to the target database. The write protection module 175 however lets the writes performed by the consumer process to proceed. The write protection module uses database triggers to implement write protections. The write protection module 175 does not perform write protection for data of tenants for which there is no data migration in progress. For example, as shown in FIG. 1, the source database includes data for tenants 170A and 170B. The data of tenant 170B is being migrated to the target database 140. The target database includes data for another tenant 170C that is not being migrated. The write protection module 175 does not perform write protection of data of tenant 170C since that tenant is not performing a data migration. The write protection module 175 performs write protection of data of tenant 170B while data of tenant 170B is being migrated. During the data migration of data of tenant 170B the write protection module 175 protects the data of tenant 170B from writes by any application or process other than the consumer process 135 that is performing the data migration. Accordingly, the write protection module 175 uses database triggers to disallow writes to data of the tenant 170B by any application other than consumer process 135 but allows writes performed by the consumer process 135 to the data of tenant 170B that are part of the data migration process. The write protection module 175 uses the metadata cache 180 to store metadata information describing tenants, for example, information indicating whether a tenant is currently performing data migration. The metadata cache 180 may also be referred to herein as the write protected tenant cache. The metadata cache 180 implements time to live (TTL) for data stored in the cache so that an object stored in the cache needs to be reloaded if the object was stored in the metadata cache 180 for more than a predetermined length of time.

The system ensures that user of database triggers does not affect performance of the database system. For example, if database triggers are executed for each row level statement executed by the target database system, the performance of the target database system may degrade thereby degrading the performance of applications using the target database system for storing and accessing data. The performance is likely to degrade because even if data for one tenant is being migrated, the system needs to check for every row level operation whether to allow the row level operation or to block the row level operation. Accordingly, if the target database system stores data for a hundred tenants and only one of these tenants is migrating data, the performance of all the remaining tenants may degrade since the database trigger needs to be processed independent of the tenant. This is so that without processing the row level operation, the system cannot determine whether the row belongs to the tenant that is migrating or another tenant. Accordingly, the check for determining whether the tenant is currently migrating data is performed for all tenants, thereby slowing their performance.

The processes described herein may be used for data migration, for example, for migrating data or applications or for other applications that require movement data from one database system to another. The system may migrate data from one version of a database system to another version of a database system. The system may migrate from a particular type of database to another type of database, for example, from database provided by a particular database vendor to a database provided by another database vendor. The system according to an embodiment, performs data migration that delivers a point in time consistent copy to the target database system that may be used for various testing scenarios.

The database copy module 150 comprises a bulk copy module 155, a catchup copy module 160, and a live synchronization module 165. The database copy module 150 may also be referred to herein as a data synchronization service. These modules execute various steps of a database copy process as shown in FIG. 2.

Figure 2:
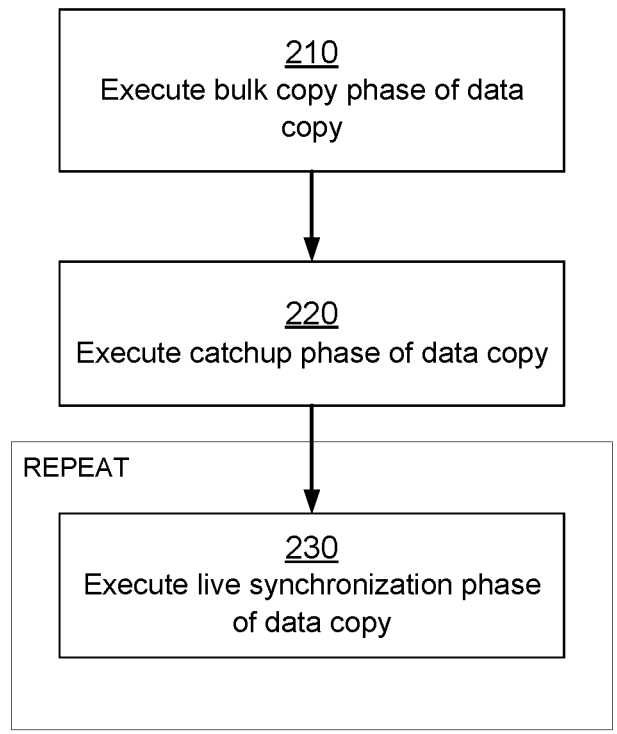
FIG. 2 is a flow chart illustrating the process for copying of data stored in a database from a source database system to a target database system, according to one embodiment.

FIG. 2 is a flow chart illustrating the process for copying of data stored in a database from a source database system 110 to a target database system 130, according to one embodiment. Steps shown in FIG. 2 may be executed by modules different from those indicated herein. Various embodiments can perform the steps of the processes in different orders than those indicated herein. Moreover, other embodiments can include different and/or additional steps than the ones described herein.

The bulk copy module 155 executes 210 a bulk copy phase that performs a bulk copy of the data stored in the source database system 110 to the target database system 130. During the bulk copy phase, the database records are copied from source database system to the target database system. This can be a long running process that could take hours or days to execute. As a result, during the bulk copy phase, the data of the source database 120 may change. The system copies the changes that occur using a change data stream. The change data stream is sent by the database copy module 150 to the target database system and processed by the consumer process 135 that receives the change data stream, analyzes the change data stream to identify the database operations corresponding to the transactions represented by the change data stream and applies the database operations to the target database 140. According to an embodiment, the change data stream comprises an ordered stream of transactions as they are committed on the source database. Each transaction has a commit time representing the time that the transaction was committed on the source database system.

According to an embodiment, the system executes change data capture (CDC) that refers to the process of identifying and capturing changes made to data in a database and then delivering those changes in real-time as a change data stream to a downstream process or system. According to an embodiment, the system extracts transaction logs of the source database system and generates the change data stream based on the transaction logs. According to an embodiment, the system sends database operations in the change data stream. These operations are executed on the target database system to reflect the changes performed in the source database system.

The catchup copy module 160 executes 220 a catchup phase of data copy. During the catchup phase, the changes that occurred in the source database 120 during the bulk copy phase are applied to the target database 140. The catchup phase brings the target database 140 to a transactionally consistent state. However, if the source database system 110 is a production system, the data stored in the source database 120 may keep getting modified as a result of ongoing transactions, for example, transactions performed as a result of client requests 115 received from client devices 105.

The live synchronization module 165 repeatedly executes 230 the live synchronization phase of data copy. During the live synchronization phase, the changes occurring on the source database 120 are continuously applied to the target database 140. In this phase the system ensures that the target database 140 is in a point-in-time consistent state with respect to the source database 120.

In some embodiments, the source database system 110 is part of a multi-tenant system. Each tenant may be an enterprise. Each tenant may represent a customer of the multi-tenant system that has multiple users that interact with the multi-tenant system via client devices.

A multi-tenant system stores data for multiple tenants in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system may execute an application server that simultaneously processes requests for a number of tenants. However, the multi-tenant system enforces tenant-level data isolation to ensure that jobs of one tenant do not access data of other tenants.

The source database 120 stores database records representing data that is processed by the source database system 110. In embodiments where the source database system is part of a multi-tenant system, the source database 120 stores data for various tenants of the multi-tenant system. The source database 120 may store data for different tenants in separate physical structures, for example, separate database tables or separate databases. Alternatively, the source database 120 may store data of multiple tenants in a shared structure. For example, user accounts for all tenants may share the same database table. However, the multi-tenant system stores additional information to logically separate data of different tenants. In embodiments that implement a multi-tenant system, the system and processes described herein allow copy of data for a particular tenant from the source database system 110 to the target database system 130.

In one embodiment, the source database system 110 is part of a multi-tenant system that implements a web-based customer relationship management (CRM) system and an application server that provides users access to applications configured to implement and execute CRM software applications.

The system illustrated in FIG. 1 may be used to generate point-in-time transactionally consistent copy of the source database. Once the system completes the catchup phase and is in live synchronization phase, the system continues to apply changes from source database to the target database. The system may stop updating the target database based on updates in the source database and the target database becomes a consistent copy of the source database until the point in time when the last change was applied.

The system illustrated in FIG. 1 may be used in other scenarios, for example, to migrate a tenant from a source database to a target database. Users of the tenant may access the data stored in the target database using applications connected to target database. In this scenario all data of the tenant is migrated from the source data to the target database. However, during the migration process users may connect to the applications connected to the source database resulting in changes that are applied to the target database. Due to user activity at the source database and replication latencies between source database system and target database system, the system may enforce a draining period during which there is a downtime for the tenant. During the draining period there are no changes to the source database and accordingly the system write protects the source database. Similarly for various reasons, the target database may also be write protected.

A database may be connected to many user applications, jobs, and administrative applications that can make changes to the data in the database. An organization may enforce architecture governance and strict controls. However, it is possible for certain application or task to bypass any mechanisms enforced and write to the database. This may happen due to malicious applications, due to human error, or other reasons. An imperfect write protection strategy could result in various issued with a copy process. For example, if there is no guarantee that the writes have stopped on the source database the system may not be able to predict when the draining process is completed. On the target database side, data being written could be manipulated by the target application. For example, an application in a multi-tenant system could potentially consider a partially completed tenant data as invalid and mark it for deletion while copy is in progress. Another job may assume that the tenant data in the target database is corrupted and may try to fix the data resulting in issues with the copy operation.

The client device 105 comprises a user interface that may be provided by an application executing on the client device 105, for example, a browser application. A user may use the user interface to interact with the online system 110. For example, the user may execute an application in connection with an interaction with one or more other users to complete a transaction.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the system architecture and the processes described herein are illustrated using a multi-tenant system, the techniques disclosed are not limited to multi-tenant systems but can be executed by any online system, for example, an online system used by a single enterprise.

Write Protection in Database System

The system according to an embodiment, write protects data for a tenant using database triggers. The system bypasses the database trigger mechanism for writes based on the consumer process that concern data migration. This allows data migration to continue while applications other than the consumer process are prevented from modifying the data for the tenant.

The system ensures that the write protection mechanism is executed efficiently while the instructions are executed for every row operation executed on the target database, and for every tenant in the database, whether or not the tenant is performing data migration.

The system performs write protection as follows to address performance issues. The target database system stores a list of tenants that need to be write protected at any given time in the metadata cache 180. According to an embodiment, the metadata cache is a session level cache. The system implements a mechanism to load the metadata cache efficiently so that the metadata cache is loaded once for multiple row level operations. The system specified a time to live (TTL) for the session level cache. The time to live in the metadata cache determines when a tenant is added to the metadata cache and when the tenant is removed from the metadata cache. This in turn determines the time interval during which write protection is implemented for data of the tenant in the target database system. The system further implements both statement level triggers and row level triggers. A transaction may execute multiple DML statements and each DML statement may process multiple rows.

Figure 3:
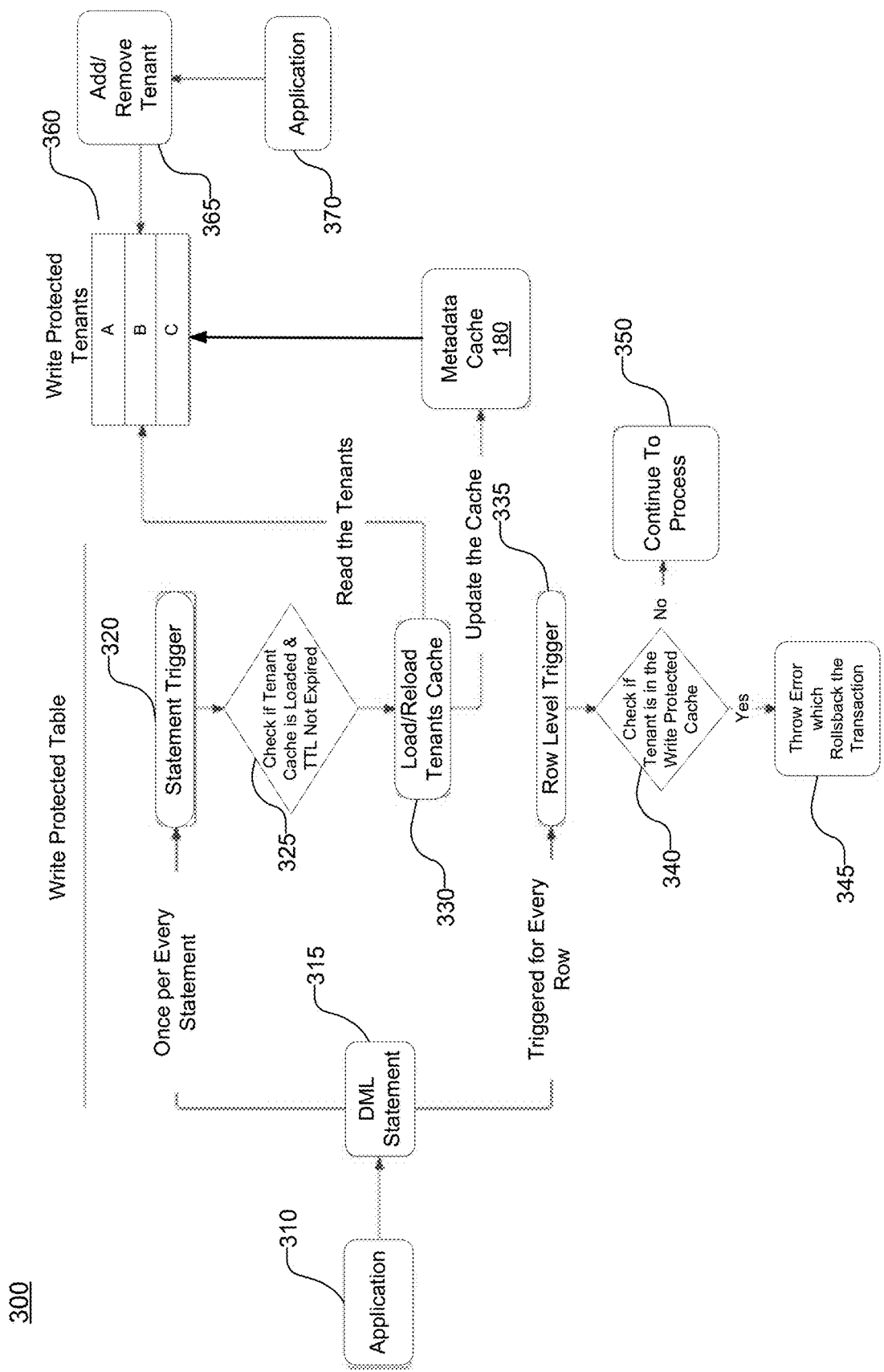
FIG. 3 is a block diagram illustrating a system environment for copying a source database to multiple target databases, according to an embodiment.

FIG. 3 illustrates the process 300 for performing write protection for data for a subset of tenants according to an embodiment.

According to an embodiment, the system stores a table containing metadata describing tenants including tenant ids and an indication of whether that table is write protected. According to an embodiment, the system may store a table with all tenants and include a flag representing whether the table is write protected or not write protected. According to another embodiment, the system stores a table that includes only tenants that are write protected. Accordingly, the information describing a tenant is added to the table when the tenant needs to be write protected, for example, when there is data migration in progress for the tenant and the information describing the tenant is removed from the table when the tenant does not need to be write protected, for example, when the data migration is completed.

An application 310 may perform DML operations on the target database system. When the system receives and executes a DML statement 315, the system loads the metadata cache 180 if not already loaded or if the system determines TTL has expired. The database system stores a list 360 of tenants that are write protected, for example, in a database table. The system determines that TTL is expired by checking 325 that the difference of the current time and the last cache load time exceeds the TTL time limit. If the system determines that the TTL time limit is exceeded, the system reloads the tenant metadata from the database table storing the list 360 of write protected tenants in the metadata cache 180. The system executes a statement level trigger 320 that executes instruction to load the metadata cache. Accordingly, the system may load or refresh the metadata cache once per transaction represented by the DML statement 315. If the metadata cache was loaded recently within a time interval that is smaller than the TTL limit, the statement trigger does not reload the metadata cache. The system updates 355 the write protected tenant cache. The metadata cache loading mechanism may load the cache multiple times in a session depending on the length of the session. For example, the metadata cache may be loaded due to execution of multiple DML statements within the same session.

If the system needs to perform replication for a tenant, the system marks the tenant as write protected, for example, by adding the tenant information in the list 360 of write protected tenants. The system should wait for all session level caches to get reloaded with the new information before the replication of the tenant is started, this duration is determined by the TTL of the Cache.

If the tenant metadata loaded in the metadata cache indicates that the tenant is write protected, an attempt to update the rows of the tenant are blocked by row level triggers 335. If the system determines 340 based on the metadata cache that the tenant is not write protected, the system continues to process 350 the subsequent row level operations of the DML statement. Accordingly, for each such modification attempted a by row level operation, the system identifies the tenant corresponding to the row and checks 340 in the metadata cache if that tenant is write protected. If the target database system determines using the metadata cache 180 that the tenant is write protected, the row level trigger throws an error or exception that causes the transaction represented by the DML statement to rollback. For example, if the DML statement updates N rows, the system starts executing the row level operations one by one. If any of the row level operations attempts to update a row for a tenant that is write protected, the row level trigger for that operation rolls back the transaction such that none of the N row level operations are performed. Typically statements process data for a single tenant. Accordingly, if that tenant is write protected, the transaction is rolled back after the first row level operation and none of the remaining row level operations need to be executed. However, the system may be able to execute statements that affect multiple tenants. In this situation, it is possible that the row processing the data of a write protected tenant is executed after performing other row level operations, thereby causing the system to perform work that is ultimately rolled back. However, the system cannot determine the tenant corresponding to a row level operation without processing the data of that row. As a result, the system may have to process each row of a statement to check if any of the associated tenants is write protected.

According to an embodiment, the system uses an application 370 that adds/removes tenants from the list 360. For example, the application 370 may determine that data migration for a tenant has started and add 365 the tenant to the database table storing the list of write protected tenants indicating that the tenant needs to be write protected. Alternatively, the application 370 may determine that data migration for a tenant has completed and remove 365 the tenant from the database table storing the list of write protected tenants indicating that the tenant no longer need to be write protected.

Figure 4:
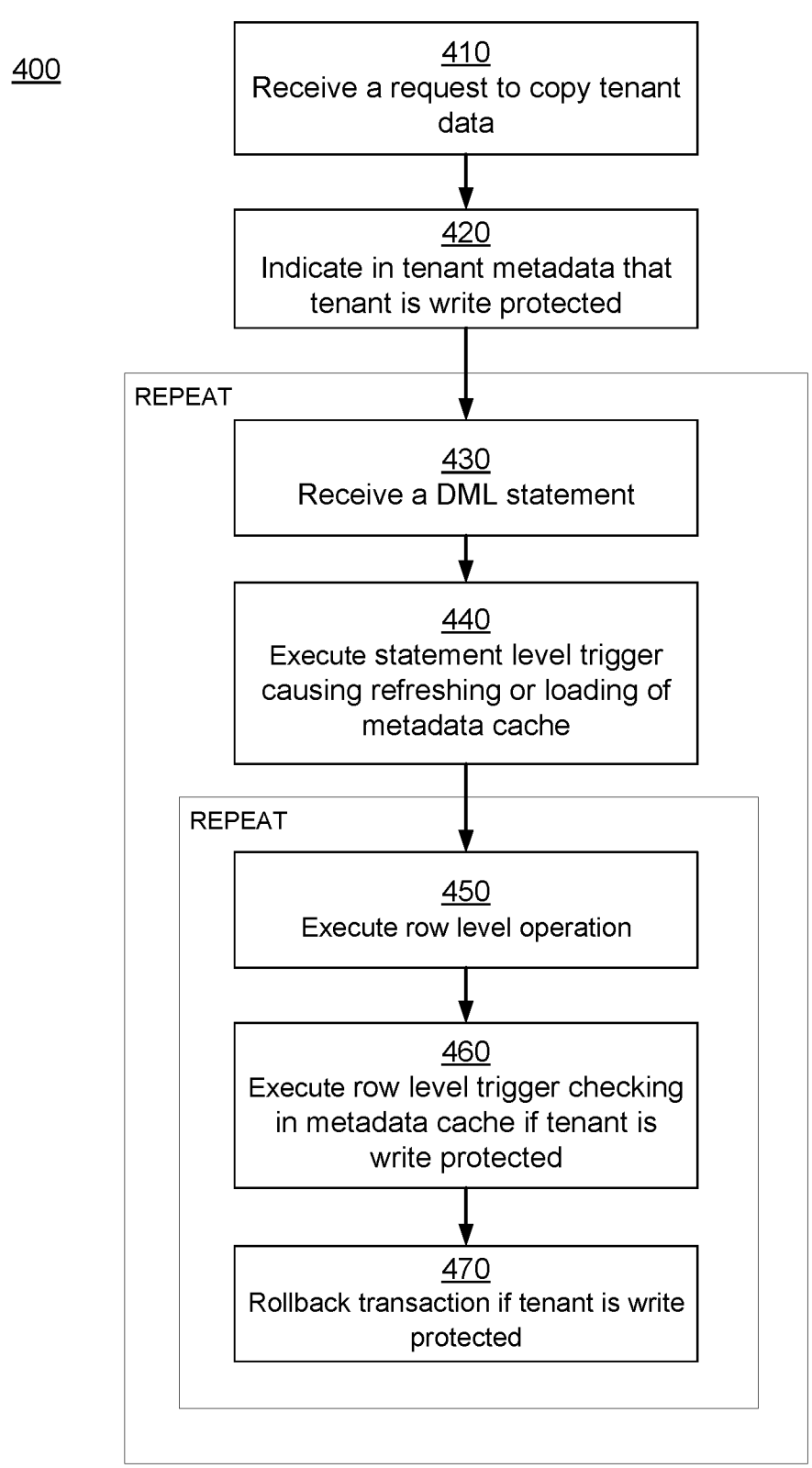
FIG. 4 is a flow chart illustrating the process 400 for enforcing write protection in a database system, according to one embodiment.

FIG. 4 is a flow chart illustrating the process 400 for enforcing write protection in a database system, according to one embodiment. Steps shown in FIG. 4 may be executed by modules different from those indicated herein. Various embodiments can perform the steps of the processes in different orders than those indicated herein. Moreover, other embodiments can include different and/or additional steps than the ones described herein.

The system receives 410 a request to copy a tenant data of a tenant T from a source database system to a target database system. The request may be received as part of a data migration operation. The source database system may store data for multiple tenants and only a subset of tenants may be copied, for example, only one tenant data may be copied while the remaining are not being copied.

The system indicates 420 in a tenant metadata that the tenant is write protected. For example, the system may include a write protected tenants table that stores a list of all tenants that are write protected at a given point in time. The system may add an identifier of tenant T in the write protected tenant table.

The system copies the tenant data by using a change data stream that may transfer change logs from the source database system to the target database system by repeatedly performing following steps at the target database system.

The target database system receives 430 a database statement, for example, a DML statement configured to perform a set of row level operations. The database statement causes execution 440 of a statement level trigger in the target database. The statement level trigger includes instructions to check if the metadata cache storing information describing the write protected tenants is loaded. If the cache is not loaded, the statement level trigger causes the metadata cache to get loaded. Alternatively, if the metadata cache is loaded but the time since the last time the metadata cache was loaded is greater than a TTL limit, the statement level trigger causes the metadata cache to be refreshed.

The DML statement includes instructions that cause a set of row level operations to be performed. The system repeatedly performs the steps 450, 460, and 470 for each row level operation. The system executes 450 a row level operation. The execution of the row level operation causes execution 460 of a row level trigger. The row level trigger access the metadata cache to check if the tenant is write protected. If the target database system determines that the tenant is write protected the target database system performs a rollback of the DML statements of the transaction.

According to an embodiment, once the copying of the tenant data is complete, the target database system indicates in the tenant metadata that the tenant is not write protected. For example, if the target database system includes the write protected tenant table, the target database system removes the tenant identifier from the write protected tenant table.

Figure 5:
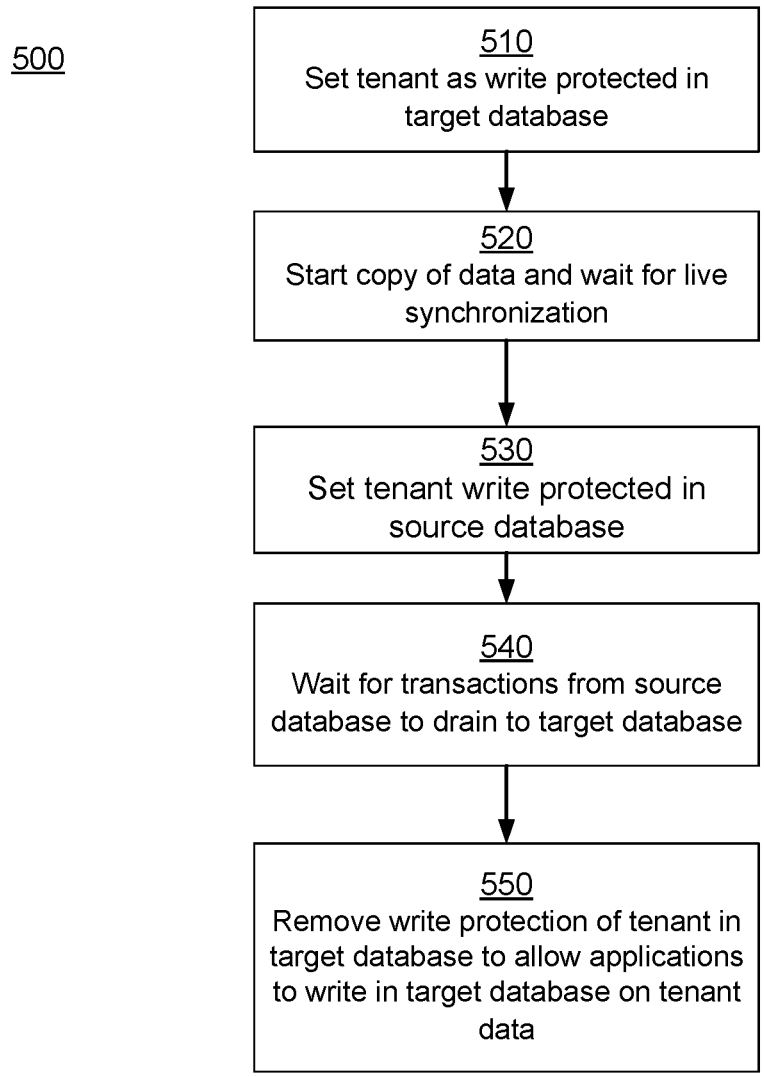
FIG. 5 is a flow chart illustrating the process 500 for enforcing write protection during tenant migration, according to one embodiment.

FIG. 5 is a flow chart illustrating the process 500 for enforcing write protection during tenant migration, according to one embodiment. The system performs migration of data of a particular tenant. The target database system sets 510 the tenant as write protected in the tenant database, for example, by adding the tenant identifier to the write protected tenant table. The system starts 520 copying of the data from the source database to the target database and waits for live synchronization process. Once the live synchronization process starts, the system sets 530 then tenant as write protected in the source database so that the source database is not modified any more. The system waits 540 for transactions from the source database to drain to the target database. Once all transactions of the source database are drained to the target database, i.e., there are no more transactions of source database left that have not been applied to the target database, the system removes 550 the write protection of the tenant in the target database, thereby allowing applications to write to the tenant data in the target database system.

Figure 6:
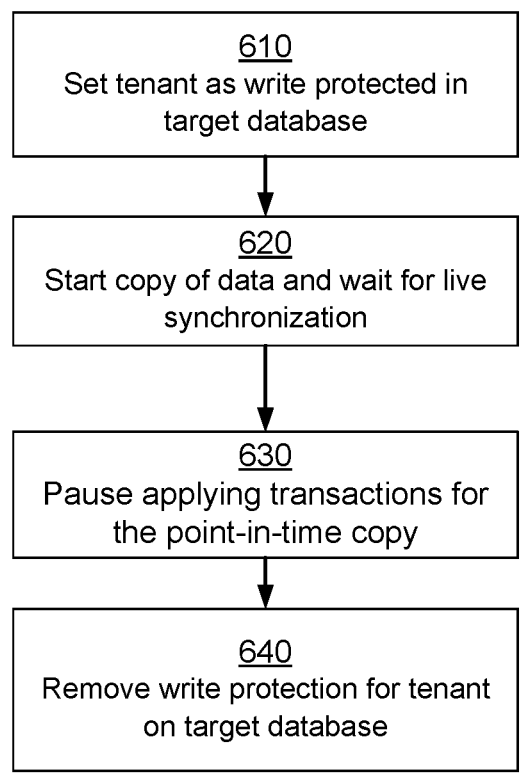
FIG. 6 is a flow chart illustrating the process 600 for enforcing write protection during generation of point-in-time consistent copy of a database, according to one embodiment.

FIG. 6 is a flow chart illustrating the process 600 for enforcing write protection during generation of point-in-time consistent copy of a database, according to one embodiment. Assume that the system receives instructions to perform a point-in-time consistent copy of the source database to the target database. The system sets 610 the tenant as write protected in the tenant database. For example, the system may add the identifier of the tenant to the write protected tenant table in the target database. The system starts 620 copying of data from the source database to the target database. The system determines a pause timestamp and pauses 630 applying transactions in the target database after the transaction having the pause timestamp or a timestamp within a threshold of the pause timestamp is applied to the target database. The system removes 640 the write protection of the tenant in the target database.

Computer Architecture

Figure 7:
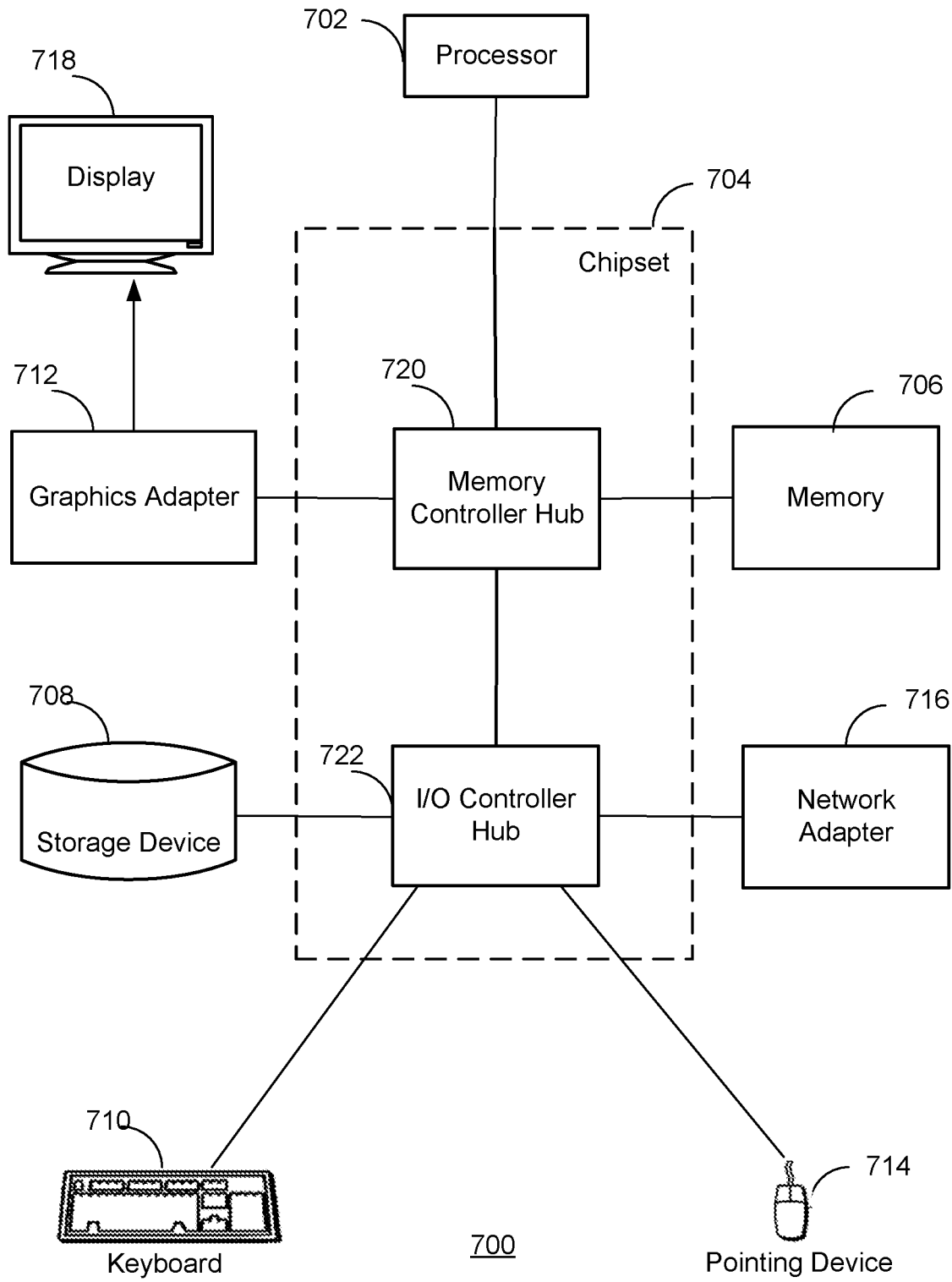
FIG. 7 is a block diagram illustrating a functional view of a typical computer system for use in the environment of FIG. 1 according to one embodiment.

FIG. 7 is a high-level block diagram illustrating a functional view of a typical computer system for use as one of the entities illustrated in the environment 100 of FIG. 1 according to an embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is a non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 200. The graphics adapter 712 displays images and other information on the display 718. The network adapter 716 couples the computer system 700 to a network.

As is known in the art, a computer 700 can have different and/or other components than those shown in FIG. 7. In addition, the computer 700 can lack certain illustrated components. For example, a computer system 700 acting as an online system 110 may lack a keyboard 710 and a pointing device 714. Moreover, the storage device 708 can be local and/or remote from the computer 700 (such as embodied within a storage area network (SAN)).

The computer 700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 708, loaded into the memory 706, and executed by the processor 702.

The types of computer systems 700 used by the entities of FIG. 1 can vary depending upon the embodiment and the processing power used by the entity. For example, a client device may be a mobile phone with limited processing power, a small display 718, and may lack a pointing device 714. The online system 110 in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A method for copying tenant data in a multi-tenant system, comprising:

receiving a request to copy a tenant data of a tenant from a source database of a source database system to a target database of a target database system;
indicating in a tenant metadata that the tenant is write protected; and
copying the tenant data, comprising: performing a bulk copy of the tenant data in the source database to the target database and, after performing the bulk copy, transferring change logs from the source database system to the target database system by repeatedly performing by the target database system:
receiving a first database statement configured to perform a first set of row level database operations, the first database statement causing execution of a first statement level trigger;
executing the first statement level trigger causing refreshing of a cache of the tenant metadata; and
executing the first set of row level database operations, wherein execution of a row level operation includes: in response to determining that the cache of the tenant metadata indicates the tenant is write protected, causing execution of a row level trigger with instructions to rollback the row level operation; and
receiving a second database statement configured to perform a second set of row level operations, the second database statement causing execution of a second statement level trigger; and
executing the second statement level trigger causes checking that the cache of the tenant metadata is loaded and does not need to be refreshed.

2. The method of claim 1, wherein indicating in the tenant metadata that the tenant is write protected comprises adding an identifier of the tenant to a write protected tenant table storing a list of write protected tenants.

3. The method of claim 2, further comprising:
responsive to copying the tenant data, indicating in the tenant metadata that the tenant is not write protected.

4. The method of claim 3, wherein indicating in the tenant metadata that the tenant is not write protected comprises removing the identifier of the tenant from the write protected tenant table.

5. The method of claim 1, further comprising:
executing the second set of row level database operations, wherein execution of a row level operation causes execution of a row level trigger with instructions to rollback the row level operation if the cache of the tenant metadata indicates the tenant as write protected.

6. The method of claim 1, further comprising:
executing the second set of row level database operations, wherein execution of a row level operation causes execution of a row level trigger, wherein the row level trigger determines that the tenant associated with the second database statement is not write protected and continues to perform one or more row level database operations from the second set of row level database operations.

7. The method of claim 1, further comprising:
determining that a time to live (TTL) value of the cache of the tenant metadata is expired; and
in response to the determining, reloading the tenant metadata from a database table storing a list of write protected tenants into the cache of the tenant metadata.

8. A non-transitory computer readable storage medium for storing instructions that when executed by one or more computer processors cause the one or more computer processors to perform steps comprising:

receiving a request to copy a tenant data of a tenant from a source database of a source database system to a target database of a target database system;
indicating in a tenant metadata that the tenant is write protected; and
copying the tenant data, comprising, transferring change logs from the source database system to the target database system by repeatedly performing by the target database system:
receiving a first database statement configured to perform a first set of row level database operations, the first database statement causing execution of a first statement level trigger;
executing the first statement level trigger causing refreshing of a cache of the tenant metadata;
executing the first set of row level database operations, wherein execution of a row level operation includes in response to determining that the cache of the tenant metadata indicates the tenant is write protected, causing execution of a row level trigger with instructions to rollback the row level operation;
receiving a second database statement configured to perform a second set of row level operations, the second database statement causing execution of a second statement level trigger; and
executing the second statement level trigger causes checking that the cache of the tenant metadata is loaded and does not need to be refreshed.

9. The non-transitory computer readable storage medium of claim 8, wherein indicating in the tenant metadata that the tenant is write protected comprises adding an identifier of the tenant to a write protected tenant table storing a list of write protected tenants.

10. The non-transitory computer readable storage medium of claim 9, further comprising:
responsive to copying the tenant data, indicating in the tenant metadata that the tenant is not write protected.

11. The non-transitory computer readable storage medium of claim 10, wherein indicating in the tenant metadata that the tenant is not write protected comprises removing the identifier of the tenant from the write protected tenant table.

12. The non-transitory computer readable storage medium of claim 8, wherein copying the tenant data comprises:
performing a bulk copy of the tenant data stored in the source database to the target database, wherein transferring change logs from the source database to the target database is performed after the bulk copy of the tenant data.

13. The non-transitory computer readable storage medium of claim 8, wherein the instructions further cause the one or more computer processors to perform steps comprising:
executing the second set of row level database operations, wherein execution of a row level operation causes execution of a row level trigger with instructions to rollback the row level operation if the cache of the tenant metadata indicates the tenant as write protected.

14. The non-transitory computer readable storage medium of claim 8, the instructions further causing the one or more computer processors to perform steps comprising:
executing the second set of row level database operations, wherein execution of a row level operation causes execution of a row level trigger, wherein the row level trigger determines that the tenant associated with the second database statement is not write protected and continues to perform one or more row level database operations from the second set of row level database operations.

15. A computer system comprising:
one or more computer processors; and
a non-transitory computer readable storage medium for storing instructions that when executed by one or more computer processors cause the one or more computer processors to perform steps comprising:
- receiving a request to copy a tenant data of a tenant from a source database of a source database system to a target database of a target database system;
- indicating in a tenant metadata that the tenant is write protected; and
- copying the tenant data, comprising, transferring change logs from the source database system to the target database system by repeatedly performing by the target database system:
  - receiving a first database statement configured to perform a first set of row level database operations, the first database statement causing execution of a first statement level trigger;
  - executing the first statement level trigger causing refreshing of a cache of the tenant metadata;
  - executing the first set of row level database operations, wherein execution of a row level operation includes in response to determining that the cache of the tenant metadata indicates the tenant is write protected, causing execution of a row level trigger with instructions to rollback the row level operation;
  - receiving a second database statement configured to perform a second set of row level operations, the second database statement causing execution of a second statement level trigger; and
  - executing the second statement level trigger causes checking that the cache of the tenant metadata is loaded and does not need to be refreshed.

16. The computer system of claim 15, wherein indicating in the tenant metadata that the tenant is write protected comprises adding an identifier of the tenant to a write protected tenant table storing a list of write protected tenants.

17. The computer system of claim 16, further comprising:
responsive to copying the tenant data, indicating in the tenant metadata that the tenant is not write protected.

18. The computer system of claim 17, wherein indicating in the tenant metadata that the tenant is not write protected comprises removing the identifier of the tenant from the write protected tenant table.

19. The computer system of claim 15, the instructions further causing the one or more computer processors to perform steps comprising:
executing the second set of row level database operations, wherein execution of a row level operation causes execution of a row level trigger with instructions to rollback the row level operation if the cache of the tenant metadata indicates the tenant as write protected.

20. The computer system of claim 15, the instructions further causing the one or more computer processors to perform steps comprising:
executing the second set of row level database operations, wherein execution of a row level operation causes execution of a row level trigger, wherein the row level trigger determines that the tenant associated with the second database statement is not write protected and continues to perform one or more row level database operations from the second set of row level database operations.

* * * * *